United States Patent [19]

Gête

[11] Patent Number: 4,683,428

[45] Date of Patent: Jul. 28, 1987

[54] METHOD OF AND A DEVICE FOR IDENTIFYING THE POSITION OF THE ROTOR OF A STEPPING MOTOR

[75] Inventor: Henri Gête, Les Hauts-Geneveys, Switzerland

[73] Assignee: Asulab S.A., Bienne, Switzerland

[21] Appl. No.: 755,753

[22] Filed: Jul. 17, 1985

[30] Foreign Application Priority Data

Jul. 27, 1984 [CH] Switzerland ............... 03648/84

[51] Int. Cl.$^4$ ............... G01B 7/14; H02P 8/00; G04F 5/00; G06F 1/04
[52] U.S. Cl. ............... 324/208; 318/696; 368/157
[58] Field of Search ............... 324/207, 208, 225; 318/696; 368/155, 156, 157, 184, 200, 202, 217, 218

[56] References Cited

U.S. PATENT DOCUMENTS 4,425,538  1/1984  Berney ............... 318/696

FOREIGN PATENT DOCUMENTS 0085648  7/1982  European Pat. Off. .

Primary Examiner—Ernest F. Karlsen
Assistant Examiner—Walter E. Snow

Attorney, Agent, or Firm—Pollock, Vande Sande & Priddy

[57] ABSTRACT

The method according to the invention is applicable to motors comprising a magnetized rotor having two diametrically opposed poles, a stator making up a magnetic circuit having saturable constricted portions and a coil coupled magnetically to the stator. The method consists in applying to the coil an electric pulse, in measuring a control current ($I'_{01}$, $I'_{02}$) generated within the coil by the electric pulse at the end of a control time interval ($t'_o - t_i$) and in comparing the control current with a reference current ($I_r$), the sign of this comparison being representative of the position of the rotor. In order to take into account the variations in the characteristics of the motor with time, the control time interval ($t'_o - t'_i$) is readjusted periodically by means of first and second electric pulses of a learning signal applied to the coil. The first pulse of this signal generates within the coil a first current ($I_1$) which reaches the reference current ($I_r$) after a first time interval ($t_a - t_i$). The second pulse generates a second current ($I_2$) which reaches the reference current ($I_r$) after a second time interval ($t_b - t_i$). The mean value of the first and second time intervals is then taken as the value of the control time interval ($t'_o - t_i$). The device for carrying out this method enables the position of the rotor to be identified under optimal conditions and can be used with advantage in timepieces.

4 Claims, 9 Drawing Figures

METHOD OF AND A DEVICE FOR IDENTIFYING THE POSITION OF THE ROTOR OF A STEPPING MOTOR

BACKGROUND OF THE INVENTION

This invention relates to a method of and to a device for identifying the angular position of the rotor of a stepping motor, when the rotor is at rest.

The method is applicable to motors comprising a magnetic stator having at least two diametrically opposed poles which can lie in two stable rest positions, a stator making up a magnetic circuit having saturable narrow portions and a coil coupled magnetically to the stator for creating therein a magnetic field interacting with the rotor. Such motors are well-known and are widely used, e.g. in watch-making, to drive the hands via a gear-train. Depending on the shape of the control signals applied to the terminals of the coil, they can also be made to rotate in one direction or in an opposite direction.

Correctly identifying the position of the rotor of a motor can be an essential factor for the proper operation of for example a watch if the motor is of the two directions of rotation type when the polarity of the next drive pulse needs to be ascertained to cause the motor to rotate in the required direction or, if the watch is provided with means for taking-up non-effected steps, to check whether the motor has performed the previous step or not.

PRIOR ART

A known method of identifying the position of a rotor, usable with this type of motor, comprises applying to the coil an electric control pulse of given amplitude and polarity but of too short a duration to cause the rotor to rotate, measuring a control current generated in the coil by this pulse for a short time at the end of a set control time interval counted from the beginning of the pulse, then comparing the control current with a reference current, the sign of the comparison being representative of the angular position of the rotor.

A timepiece motor having the stated features, a circuit for controlling the motor and a circuit for identifying the position of the rotor by means of this method are described in detail, e.g., in EP No. 0085648, applied for on 1 July 1982 by ASULAB S. A.

In the above known method, the control current is measured for a short time at the end of a fixed control time interval, set in dependence on the characterisitcs of the motor, some of which may have a strong influence on this time interval. Thus, if the characteristics of the motor vary, the position of the rotor can no longer safely be identified and may even be incorrect. Now the constancy of the characteristics cannot be guaranteed: they may change under the influence of age or temperature, or as a result of a change in the rotor load if the latter is, e.g., a calendar. Furthermore, even with motors of a given type, the characteristics vary to some extent. During production, this could mean having to adjust the control time interval for each individual motor, an additional operation causing an increase in production costs. For after-sales service purposes, the replacement of the motor could result in the same problem.

SUMMARY OF THE INVENTION

A main object of the invention is to eliminate this drawback by making it possible to set a control time interval such that it corresponds to the particular characteristics of the motor being used.

To achieve this object, the method provided by the invention involves applying to the coil of the motor a first electric pulse, measuring a first current in the coil generated by the first pulse, determining a first time interval corresponding to the time needed by the first current to reach the value of the reference current, memorising the first time interval, applying to the coil a second electric pulse having the same amplitude as the first pulse but of opposite polarity, measuring a second current in the coil generated by the second pulse, determining a second time interval corresponding to the time needed by the second current to reach the value of the reference current, and determining the mean value of the fist and second time intervals, said mean value corresponding to the control time interval.

With the method according to the invention, the control current is measured at the end of an optimal control time interval set by a process involving the particular motor under consideration. This ensures that the position of the rotor will be identified under the best possible conditions.

The control device for carrying out the method according to the invention comprises means for generating an electric control pulse, means for applying said electric control pulse to the coil of the motor, means for measuring a control current, generated within the coil by the electric control pulse, at the end of a control time interval counted from the beginning of said control pulse, memory means for storing said control time interval, and means for comparing the control current to a reference current and generating a signal representative of the sign of the comparison, said signal indicating the position of the rotor, and is characterized in that it further comprises means for generating a first electric pulse, means for applying the first electric pulse to the coil of the motor, means for measuring a first current, generated within the coil by the first pulse, means for setting a first time interval corresponding to the time needed by the first current to reach the value of the reference current, means for generating a second electric pulse having the same amplitude as the first pulse but of opposite polarity, means for applying the second pulse to the coil, means for measuring a second current, generated within the coil by the second pulse, means for setting a second time interval corresponding to the time needed by a second current to reach the value of the reference current, means for adding the second time interval to the first and means for calculating the mean value of these two time intervals and transferring said mean value to the memory means, said mean value being the control time interval.

The method and device according to the invention are of the self-adapting type, which constitutes a great advantage: they enable an optimal control time interval adapted to the characteristics of the motor to be set by means of a learning process controlled by the first and second electric pulses.

Secondly, since the characterisitcs of a motor usually evolve slowly, it is not necessary to use permanently the part of the device according to the invention that enables the mean time interval to be set, but to use it only for a brief moment from time to time. Its consumption of current thus becomes insignificant.

BRIEF DESCRIPTION OF THE DRAWINGS

In the accompanying drawings, given by way of example.

DETAILED DESCRIPTION

The method according to the invention for identifying the position of the rotor of a motor is an improved version of a known method usable only with a particular kind of known motor. To set forth the advantages of the invention an example of a known motor and method will first be described briefly with reference to the EP No. 0085648, mentioned earlier.

To avoid confusions in the text, reference numbers less than 200 are from EP No. 0085648 whereas reference numbers equal to or greater than 200 are concerned with the present invention.

Figure 1:
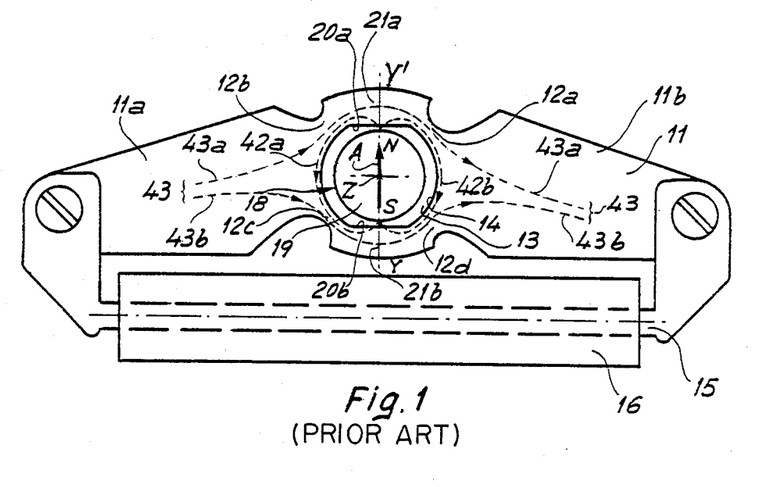
FIG. 1 is a diagrammatic plan view of a known stepping motor able to rotate in both directions.

FIG. 1 shows a form of stepping motor described in detail in EP No. 0085648, able to rotate in one direction in response to control pulses of one polarity, and to rotate in the opposite direction in response to control pulses of opposite polarity.

The motor has a stator 11 fixed by means of screws to the core 15 of a coil 16 and a rotor 18 provided with a cylindrical permanent magnet 19, having a diametrical magnetic axis A, mounted for rotation about an axis Z in a central recess 13 within stator 11. Recess 13 is delimited by an inner cylindrical surface 14 coaxial with axis Z of rotor 18, except for two diametrically opposite areas formed by a pair of flat surfaces 20a and 20b to provide rotor 18 with two rest positions in which magnetization axis A lines up with a static equilibrium axis YY'.

The stator is made up of a pair of solid polar portions 11a and 11b located on opposite sides of axis YY'. They are connected to each other by first and second intermediate portions 21a and 21b and by four narrow link portions 12a, 12b, 12c and 12d. Link portions 12a and 12c are set symmetrically with respect to axis Z, as are link portions 12b and 12d. Furthermore, the link portions are located in such a way that polar portions 11a and 11b of the stator are connected to each other by link portions 12a and 12b via intermediate portion 21a and that the same polar portions 11a and 11b of the stator are connected to each other by link portions 12c and 12d via intermediate portion 21b. Finally, link portions 12a and 12c have a minimum width 1 and link portions 12b and 12d have a minimum width 1' which is 2 to 4 times greater than 1.

The magnet 19 of rotor 18 generates within stator 11 a magnetic flux shown by induction lines 42a and 42b that are symmetrical with respect to axis YY'. In the example shown in FIG. 1, induction lines 42a run through first narrow portion 12b then through narrow portion 12c, and induction lines 42b run first through narrow portions 12a then through narrow portion 12d. If at an initial instant $t_i$ an electric pulse of constant amplitude is now applied to coil 16, it will generate within the latter an increasing current which in turn will produce an increasing magnetic flux in the stator. Thus flux, shown by induction lines 43, is directed, in the case of FIG. 1, from polar portion 11a towards polar portion 11b, splitting into two separate fluxes around rotor 18. The first flux is shown by induction lines 43a. They run first through narrow portion 12b and then through narrow portion 12a. Similarly, the second flux is shown by induction lines 43b, which run first through narrow portion 12c and then through narrow portion 12d. As a result, induction lines 42b and 43a in narrow portion 12a and induction lines 42a and 43b in narrow portion 12c run in the same direction, inducing a strong magnetic flux in narrow portions 12a and 12c of lesser width. Similarly, induction lines 42a and 43a in narrow portion 12b and induction lines 42b and 43b in narrow portion 12d run in opposite directions inducing a weak magnetic flux in narrow portions 12b and 12d of greater width.

Figure 2:
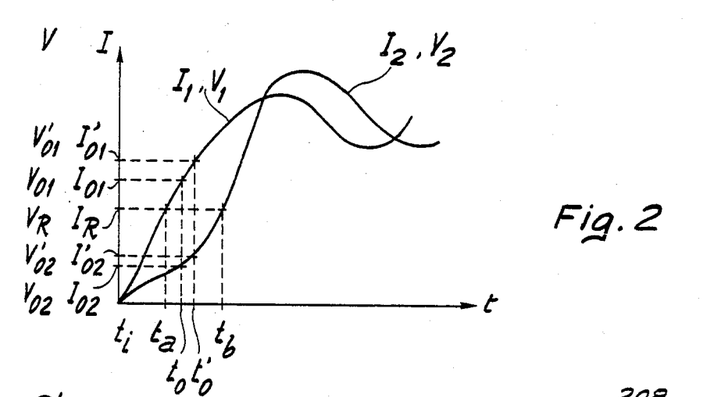
FIG. 2 is a graph showing the variation of current flow within the coil of the motor illustrated in FIG. 1, generated by a first electric pulse and by a second electric pulse of opposite polarity applied to the coil.

Let $I_1$ be the current in coil 16 which causes the fluxes to be distributed as described above in narrow portions 12a to 12d. As shown in FIG. 2, current $I_1$ increases exponentially with time from initial instant $t_i$ corresponding to the beginning of the electric pulse applied to coil 16. Current $I_1$ then increases more rapidly as narrow portions 12a and 12c become saturated. Finally, when the rotor starts to rotate, the voltage induced in coil 16 causes the increase in current to slow down and then to decrease. The evolution of the current during rotation of the rotor is of no interest as such in the present case.

Suppose now that at initial instant $t_i$ an electric pulse, having the same amplitude as the pulse which generated current $I_1$ but of opposite polarity, is applied to coil 16. This second pulse will induce in stator 11 an increasing magnetic flux having induction lines oppositely directed to induction lines 43. If follows from the above reasoning that the magnetic flux generated by rotor 18 and the second electric pulse will be substracted from each other in narrow portions 12a and 12c of lesser width and added to each other in narrow portions 12b and 12d of greater width.

Now let $I_2$ be the current generated in coil 16 by the second mentioned electric pulse. This current first increases exponentially from initial instant $t_i$ for a time longer than current $I_1$, as shown in FIG. 2. This increase then accelerates as one pair of narrow portions 12a, 12c or 12b, 12d becomes saturated. The saturation due to current $I_2$ starts later than the saturation due to current $I_1$ because the magnetic fluxes in narrow portions 12a and 12d of lesser width are subtractive with current $I_2$ and cumulative with current $I_1$. If follows therefore that current $I_2$ is of lesser value than current $I_1$ approximately until the moment when the motor starts to rotate, in one direction or the other, depending on whether rotation is due to current $I_1$ or current $I_2$.

Given the symmetrical structure of the motor, clearly currents $I_1$ and $I_2$ would be inverted if rotor 18 were in the other position of equilibrium, with the same electric pulses being applied to coil 16.

It follows from the above that if the value of a control current in coil 16 is measured at the end of a control timer interval $t_o - t_i$, i.e. at a control instant $t_o$, chosen conveniently while the rotor is still motionless, the current being generated by an electric control pulse applied to the coil, the position of rotor 18 and the direction in which it will tend to rotate can be determined. Thus in FIG. 2, at control instant $t_o$, current $I_1$ has a value $I_{01}$ and current $I_2$ a value $I_{02}$, less than $I_{01}$. A comparison of currents $I_{01}$ and $I_{02}$ with one another defines the position of the rotor and the direction in which it will rotate in response to a given electric pulse. This comparison may also be made between either current $I_{01}$ and $I_{02}$ and a reference current $I_r$ having an intermediate value between $I_{01}$ and $I_{02}$. Only the sign of the comparisons between currents is of course of any significance, and not the actual values of the currents obtained.

One possible form of embodiment of a control device designed to be associated with a motor of the kind having two directions of rotation and described above is shown in FIG. 3. This device is a control circuit 208, able to supply to the coil of the motor electric drive pulses having a polarity corresponding to the initial position of the rotor and to the chosen direction of rotation.

Figure 3:
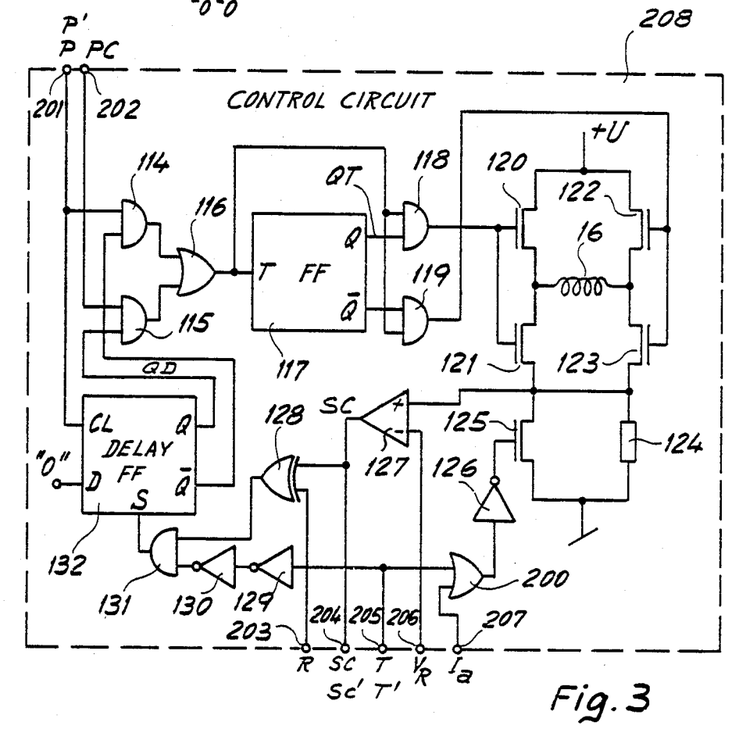
FIG. 3 shows a known circuit for operating the motor illustrated in FIG. 1 in both directions of rotation and which has been slightly modified to make it compatible with the invention.

Control circuit 208 comprises seven terminals 201 to 207, coil 16 mentioned above, components 114 to 132 and a two-input OR gate 200. Only OR gate 200 is specific to a form of embodiment of the invention. The rest of the circuit and the references are identical to the circuit shown in FIG. 10 of EP No. 0085648 in which its operation is explained in detail; that part of the circuit will therefore only be described summarily in this specification.

Control circuit 208 comprises a terminal 201 connected to one of the two inputs of an AND gate 114, and a terminal 202 connected to one of the two inputs of an AND gate 115. The outputs of these two gates are connected to the two inputs of an OR gate 116 whose output is connected to input T of a flip-flop 117 whose state changes every time the input switches from a low logic level, or "0", to a high logic level, or "1". Flip-flop 117 has two outputs Q and $\overline{Q}$. Output Q is connected to one of the two inputs of an AND gate 118 and output $\overline{Q}$ to one of the two inputs of an AND gate 119, the other inputs of these two gates being connected to the output of OR gate 116. Motor coil 16 is connected in the usual way in a bridge of four MOS control transistors 120 to 123. The control electrodes of transistors 120 and 121, respectively of p and n type, are connected to the output of AND gate 118, while those of transistors 122 and 123, respectively of p and n type, are connected to the output of AND gate 119.

The sources of transistors 120 and 122 are connected to the positive pole +U of a voltage supply source not shown, whereas between the sources of transistors 121 and 123 and a ground connection there is a resistor 124 across which is connected a transistor 125 of n type. The current flowing through coil 16 can thus be measured by the voltage drop it generates between the terminals of resistor 124. Thus voltages $V_1$, $V_2$, $V'_{01}$, $V_{01}$, $V'_{02}$ and $V_{02}$ correspond respectively to currents $I_1$, $I_2$, $I'_{01}$, $I_{01}$, $I'_{02}$ and $I_{02}$ in FIG. 2. When not used for measuring current, this resistor may be short-circuited by transistor 125, whose control electrode is connected to the output of an inverter 126. The sources of transistors 121 and 123 are also connected to the non-inverting input of a differential amplifier 127 used as a comparator, the inverting input of this amplifier being connected to a terminal 206 of circuit 208. One input of two-input EXCLUSIVE OR gate 128 is connected to the output of differential amplifier 127 and to a terminal 204 of circuit 208, while the other input is connected to a terminal 203 of the same circuit.

The output of gate 128 is connected to one input of a two-input gate 131, the other input of this gate being connected to the output of an inverter 130. The input of inverter 130 is connected to the output of an inverter 129 whose input is connected to a terminal 205 of circuit 208. The purpose of inverters 129 and 130 is to cause a delay in the signal running through them in order to avoid overlappings in AND gate 131 with the output signal of EXCLUSIVE OR gate 128. The output of gate 131 is connected to the setting input S of a delay flip-flop 132. The clock input CL of flip-flop 132 is connected to terminal 210, its input D is maintained permanently at low or "0" logic level, while its outputs Q and $\overline{Q}$ are connected respectively to the other two inputs of AND gates 115 and 114. Finally a two-input OR gate 200, specific to the invention, has one input connected to terminal 205 and the other input to a terminal 207 of circuit 208, while the output of this gate is connected to the input of inverter 126.

Terminals 201, 202, 203, 205, 206 and 207 of circuit 208 in FIG. 3 respectively receive signals P, PC, R, T, $V_R$ and $I_a$.

Signal $I_a$ is considered for the time being as being permanently low. Under these conditions OR gate 200 has no other function than to connect terminal 205 to the input of inverter 126. Signal $V_R$ is a reference voltage corresponding to reference current $I_R$. Control instant $t_o$ of the current in coil 16 and the duration of the measurement of this current are defined by a control signal T made up of a series of short pulses. The direction of rotation of the motor depends on the state of logic signal R. Suppose that this signal is high, which corresponds to, e.g., a forward rotation. The motor is caused to rotate by normal control pulses P of indeterminate duration, roughly 5 to 6 ms, or correction control pulses PC having the same duration as pulses P but delayed with respect thereto, by e.g. 62 ms.

Figure 4:
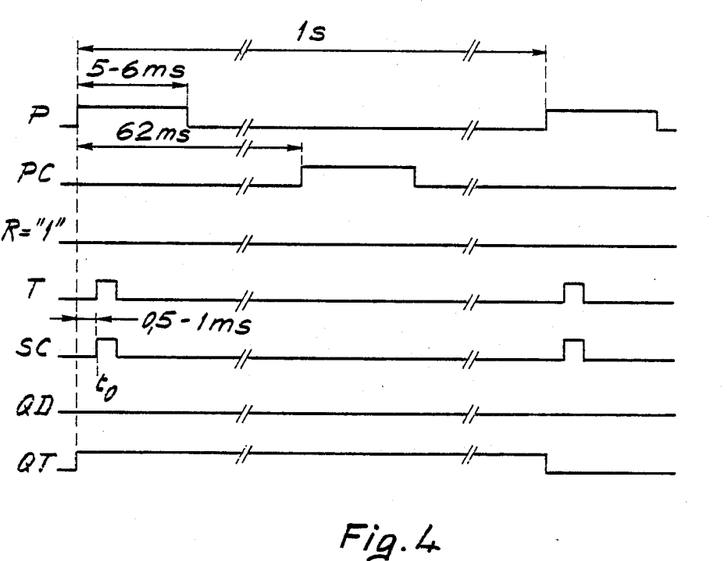
FIG. 4 is a diagram showing the shape of the signals as they appear at various points of the FIG. 3 circuit.

Signals P, PC and T have a periodicity of 1 second and are generated in known manner, in a logic circuit not shown, from a high frequency reference signal. These signals are shown in FIG. 4, which is identical to FIG. 11a in EP No. 0085648, and wherein are also shown signals QT, QD and a comparison signal SC measured respectively at output Q of flip-flop 117, at output Q of flip-flop 132 and at the output of differential amplifier 127.

The operation of the FIG. 3 circuit will now be described. Suppose that at an instant just before the beginning of normal control pulse P, the outputs Q of flip-flops 117 and 132 are low or "0" and signal R is high or "1", corresponding to forward motion of the motor. Under these conditions the outputs of all the AND gates in circuit 208 are low. As a result, transistors 120 and 122 are conductive or saturated and transistors 121 and 123 are blocked, short-circuiting coil 16. Suppose also that control signal T is low, thus rendering transistor 125 conductive by virtue of inverter 126. Output SC of amplifier 127 is then also low. When a normal control pulse P is applied to terminal 201, it reaches one input of AND gate 114. Since the other input of this gate, which is connected to output $\overline{Q}$ of flip-flop 132, is high, pulse P travels through AND gate 114 and OR gate 116 to reach input T of flip-flop 117. In response to pulse P, output Q of flip-flop 117 goes high. AND gate 118 then opens but AND gate 119 remains closed since the state of its inputs has only been inverted. Transistor 120 becomes blocked while transistor 121 becomes conductive. A current then begins to flow in coil 16 from transistor 122 to transistor 121, measurement resistor 124 being short-circuited by transistor 125. The state of the outputs of the other elements, including flip-flop 132, remains unchanged.

The control current is measured in coil 16 at instant $t_o$ by means of control signal T. This signal, which is applied to the terminal 205 of circuit 208, contains control pulses having a duration of 15 to 60 $\mu$s which occur at control instant $t_o$, counted from the beginning of pulse P corresponding to initial instant $t_i$. The value of $t_o - t_i$ is fixed and ranges from 0.5 to 1 ms depending on the characteristics of the motor. The control pulses, which flow through OR gate 200 and inverter 126, cause transistor 125 to be blocked for a brief moment. The control current in coil 16 is thus forced to flow momentarily in measurement resistor 124 across which then appears a voltage proportional to this current. Two cases may then occur.

In the first case suppose that the voltage across the terminals of resistor 124, referred to as $V_{01}$ in FIG. 2, is higher than reference voltage $V_R$. This means that the rotor is about to rotate forwards. A high logic level then appears on signal SC at the output of amplifier 127. This signal causes the output of EXCLUSIVE OR gate 128 to go low and AND gate 131 to close. Gate 131 can then no longer transmit signal T, which is applied to it via inverters 129 and 130, to the setting input S of flip-flop 132. Flip-flop 132 thus retains its initial logic state in which output Q is low. Under these conditions normal control pulse P is transmitted to control transistors 120 and 123 of coil 16, causing the motor to move forward one step. The correction control pulse PC, which is applied 62 ms later on terminal 202, is stopped however by AND gate 115. In other respects, after normal drive pulse P has been applied, all elements have returned to their initial logic state with the exception of flip-flop 117 whose output Q is now high.

In the second case, the voltage between the terminals of resistor, 124, referred to as $V_{02}$, is lower than $V_R$. This may occur when the motor has performed an accidental step following e.g. an angular impact during the previous second. A normal drive pulse P would then cause the motor to rotate backwards. This situation is however avoided because comparison signal SC on the output of amplifier 127 then remains low, thus causing the output of EXCLUSIVE OR gate to remain high. Under these conditions, AND gate 131 transmits pulse T to the setting input S of flip-flop 132, causing the output Q of this flip-flop to be high and its output $\overline{Q}$ to be low. This causes AND gate 114 to close and to stop normal control pulse P to be transmitted to the motor, which does not rotate in the wrong direction. On the other hand, AND gate 115 becomes conductive for correction control pulse PC, generated 62 ms later. This pulse flows through OR gate 116 and switches the state of flip-flop 117, thus opening AND gate 119 and closing AND gate 118. Transistors 121 and 122 being then blocked and transistors 120 and 123 conductive, coil 16 receives a correction drive pulse of opposite polarity to that of the corrective drive pulse which started being applied to it by normal control pulse P. The next normal control pulse received by the input of flip-flop 117 will change the state of the latter, with output Q going high and output $\overline{Q}$ going low. The motor will then receive a normal drive pulse of opposite polarity to that of the previous correction drive pulse, causing the motor to perform a forward step.

The same process occurs with each normal control pulse of the motor and, each time the rotor is not in the correct position for rotating in the required direction, the pulse is stopped and it is the next correction drive pulse which will cause the motor to rotate in the required direction. The order of succession of the polarities of the normal drive pulses it receives after is thus the opposite to that of the pulses it received before, assuming of course that the logic level of signal R controlling the direction of rotation remains unchanged.

The operation of the control circuit is entirely similar when the motor is required to rotate in an anti-clockwise direction, in response to a low logic level of signal R. This is explained in EP No. 0085648 but, since this is not essential to the understanding of the invention, no details about the behaviour of the circuit in this case are given in the present specification.

Figure 5:
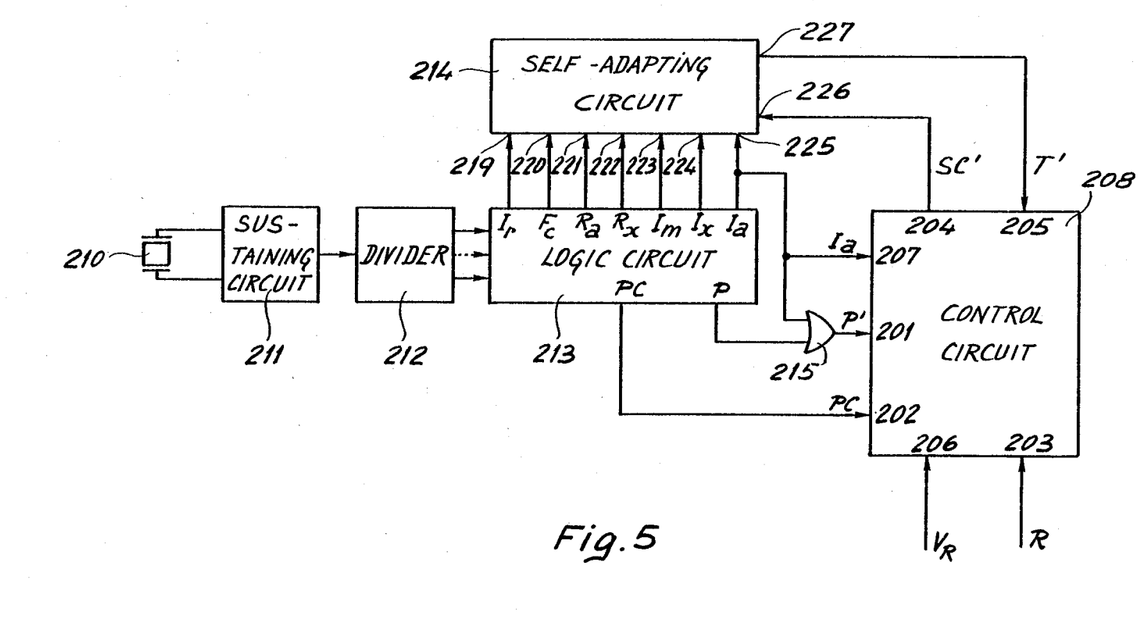
FIG. 5 is an example of a circuit in a watch provided with a device according to the invention.

FIG. 5 is an example of a circuit in an analogue watch provided with a device according to the invention for identifying the position of the rotor of the stepping motor of the watch. This circuit comprises a quartz resonator 210 connected to a sustaining circuit 211, the arrangement forming an oscillator. This oscillator issues a reference time signal, having a very stable frequency, typically of 32,768 Hz, which is applied to the input of a frequency divider 212. A logic circuit 213 receives on its multiple input signals of different frequencies, usually binary, issuing from the frequency divider to generate logic signals needed for the control of the other circuits of the watch. These logic signals, referred to as $I_r$, $F_c$, $R_a$, $R_x$, $I_m$, $I_x$ and $I_a$, are applied respectively to inputs 219 to 225 of a self-adapting circuit 214. The FIG. 5 circuit further comprises a control circuit for the stepping motor that is identical to circuit 208 in FIG. 3 described above. Terminal 210 of this circuit, which receives a signal P', is connected to the output of a two-input OR gate 215. One input of this gate receives signal $I_a$ and the other input receives signal P, generated by circuit 213, which is identical to normal drive pulse P mentioned earlier and shown in FIG. 3. Similarly, terminal 202 receives a signal PC, generated by circuit 213, which is identical to correction control pulse PC described earlier and shown in FIG. 4. Inputs 203 and 206 receive respectively signals R and $V_R$ described earlier. The output terminal 204 of circuit 208, which receives a comparison signal SC' in response to signal P', is connected to an input terminal 226 of circuit 214. Circuit 214 finally issues, on terminal 227, a control signal T' which is applied to terminal 205 of circuit 208.

Quartz resonator 210, sustaining circuit 211 and frequency divider 212 are known elements and are not described here, neither is the structure of logic circuit 213 which is familiar to the man of the art.

It should be pointed out that the FIG. 5 circuit behaves in the same way as the circuit in FIG. 10 of EP No. 0085648 when signal $I_a$ is constantly of low logic level and that control signal T is applied to terminal 205.

The principle of operation of the FIG. 5 circuit, using the method according to the invention, will now be described. In this case self-adapting circuit 214 generates control signal T'. This signal contains a control pulse which appears $t'_o - t_i$ seconds after the beginning of each normal pulse P (see FIG. 2). If signal $I_a$ is constantly of low logic level, the FIG. 5 circuit will of course act in the same way as the circuit in FIG. 10 of EP No. 0085648 except that instant $t_o$ is replaced by instant $t'_o$.

According to the invention, instant $t'_o$, as opposed to instant $t_o$ which is fixed, is variable and periodically adapted to the characteristics of the motor and to the load it drives. This adaptation is performed by means of signal $I_a$ containing learning pulses. Since the evolution of the characteristics of the motor is slow, it is of interest to choose a long time interval between two pulses, e.g. 64 seconds at the most, to diminish the current consumption.

In response to signal $I_a$, circuit 214 determines instant $t'_o$ and time interval $t'_o - t_i$, which is stored in the memory and periodically readjusted.

Before describing self-adapting circuit 214, the principle for determining according to the invention control instant $t'_o$ will first be described with the aid of the diagram in FIG. 5a.

In this diagram signal P contains a drive pulse $P_1$ and signal $I_a$ contains two learning pulses $I'_a$ and $I''_a$ which follow each other closely and which are located outside pulse $P_1$. The beginning of pulse $P_1$ defines initial instant $t_i$ acting as time origin. The beginning of pulses $I'_a$ and $I''_a$ define respectively instants $t'_i$ and $t''_i$.

Signals P and $I_a$, which are applied to the input 201 of circuit 208, are transformed by control transistors 120 to 123 into a signal V made up of voltage pulses $V_{P1}$, $V'_a$ and $V''_a$ applied to the terminals of motor coil 16. Pulse $V_{P1}$ corresponds to a normal drive pulse, while pulses $V'_a$ and $V''_a$ correspond to first and second learning pulses. If $V_{P1}$ is a positive pulse, $V'_a$ will be a negative pulse and $V''_a$ will again be a positive pulse. In response to signal V a signal I appears, representing the current in coil 16. During drive pulse $V_{P1}$, this current is identical to current $I_1$ in FIG. 2 if the motor performs a step in the normal direction. Pulse $V'_a$, of opposite polarity to $V_{P1}$, generates within the coil a current which is also identical to current $I_1$ since the motor rotated during the previous pulse. The duration of pulse $V'_a$ is chosen sufficiently long to enable the current to reach the value of reference current $I_R$ at an instant $t_a$, but not long enough for the motor to perform one step. Finally pulse $V''_a$, of opposite polarity to pulse $V'_a$, generates within the coil a current identical to current $I_2$ in FIG. 2 since the motor did not rotate during pulse $V'_a$. The duration of pulse $V''_a$ is equal to that of pulse $V'_a$, i.e. long enough for the current to reach at an instant $t_b$ the value of reference current $I_R$, but too short to cause the motor to rotate in the opposite direction.

Figure 5A:
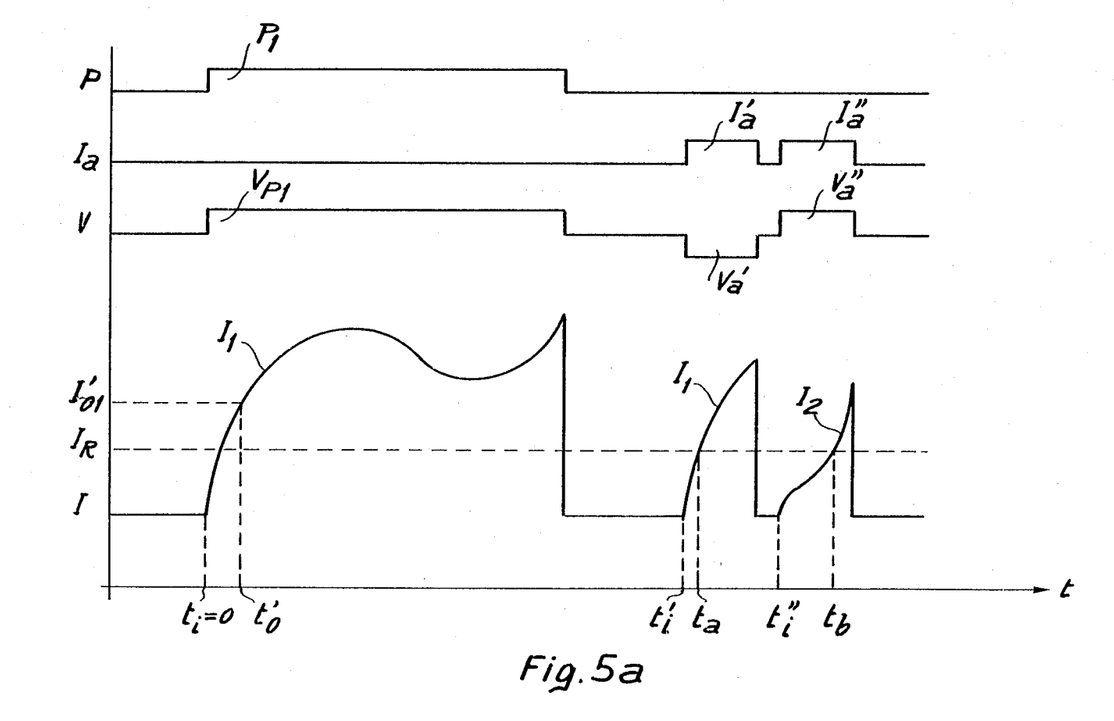
FIG. 5a is a diagram showing the principle according to the invention for determining the control instant $t'_o$ of the current in the motor.

It should be noted that in the case of FIG. 5a with pulse $V'_a$ being negative, the current it generates within coil 16 is of opposite sign to the currents generated by pulses $V_{P1}$ and $V''_a$. To simplify matters in the drawing, all currents are however shown with the same sign. This also stems from the fact that the measurement of these currents in the FIG. 3 circuit is done by measuring the always positive voltages that they generate across the terminals of resistor 124.

First learning pulse $V'_a$ enables a first time interval $t_a - t'_i$ to be determined and the second pulse enables a second time interval $t_b - t''_i$ to be determined. By calculating the mean value of these two time intervals and making it equal to time interval $t'_o - t_i$, the value of control current $I'_{01}$ at instant $t'_o$ thus defined will be greater than reference current $I_R$. Similarly, if $V_{P1}$ is negative, $V'_a$ is positive and $V''_a$ is negative, then in signal I of FIG. 5a currents $I_1$ and $I_2$ should be swapped. This would change neither the means time interval nor $t'_o$, but the control current at that instant would then be $I'_{02}$, less than $I_R$.

Reference current $I_R$ will thus always lie between $I'_{01}$ and $I'_{02}$ if time interval $t'_o - t_i$ is determined as explained above. This is the object of the invention because this condition is necessary for identifying in a positive way the position of the rotor of a motor.

Figure 6:
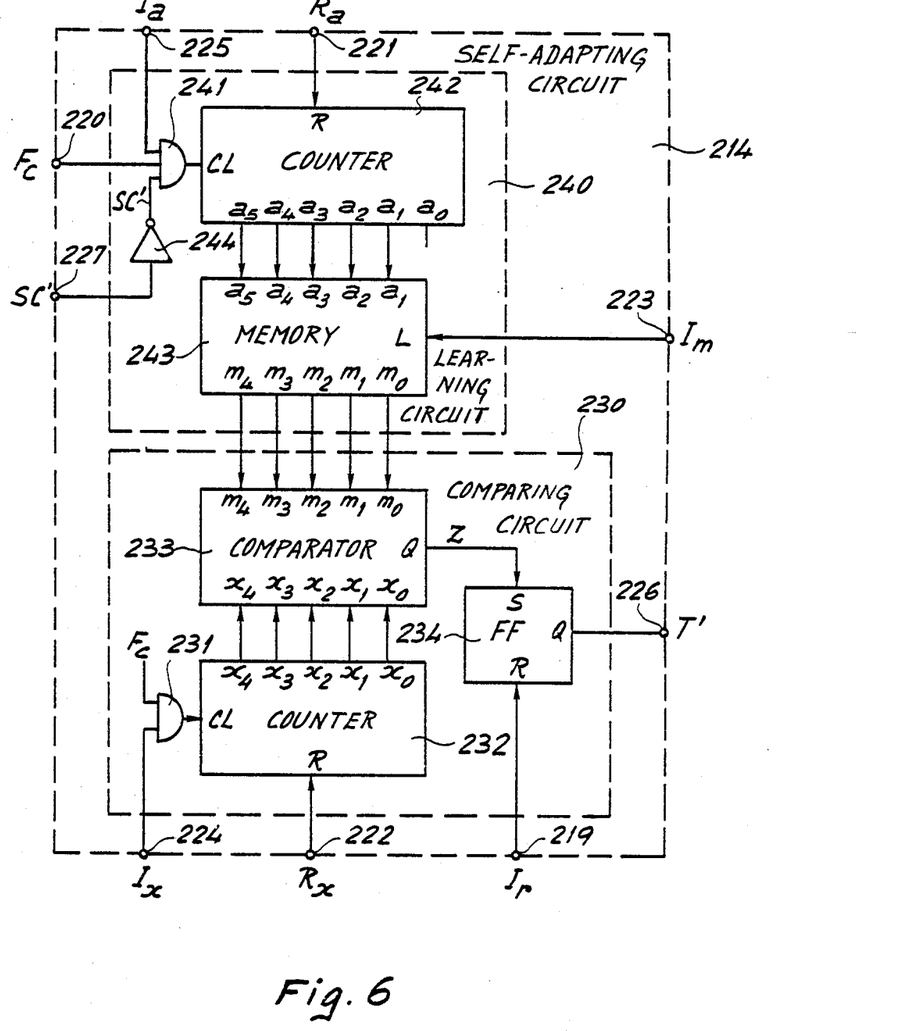
FIG. 6 is the circuit of an example of a device according to the invention.

Self-adapting circuit 214, shown in detail in FIG. 6, will now be described. It can be split up into a comparing circuit 230 and a learning circuit 240.

Comparing circuit 230 comprises a two-input AND gate 231 with one input connected to terminal 220 of circuit 214 to receive signal $F_c$ and the other input connected to terminal 224 to receive signal $I_x$. The output of AND gate 231 is connected to the clock input CL of a binary counter 232. Counter 232 has a reset input R connected to terminal 222 to receive signal $R_x$, and a multiple output $x_i$ ($i-$, e.g., 0 to 4) whose logic state determines a binary number $X = x_4 x_3 x_2 x_1 x_0$. Multiple output $x_i$ is connected to a multiple input, bearing the same name $x_i$ ($i = 0$ to 4), of a comparator 233 which receives on another multiple input $m_j$ ($j = 0$ to 4) a signal whose logic state determines a logic number $M = m_4 m_3 m_2 m_1 m_0$. This counter issues on its output Q a signal Z whose logic state depends on the difference X-M. If X-M is negative, signal Z goes low, whereas if X-M equals zero or is positive, signal Z goes high. Finally signal Z is applied to the set input S of a bistable SR flip-flop 234. The reset input R of this flip-flop is connected to terminal 219 to receive signal $I_r$, while output Q, on which signal T' appears, is connected to terminal 226.

Figure 7:
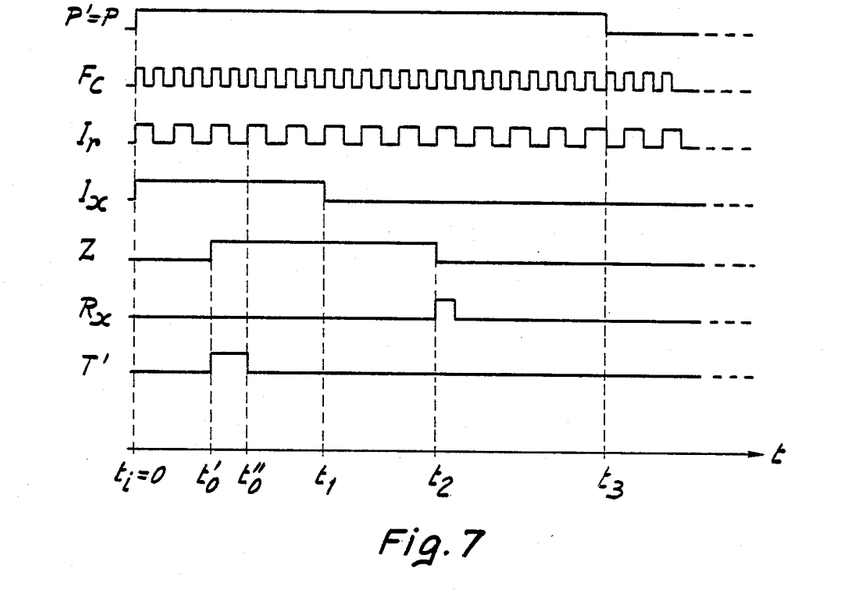
FIGS. 7 and 8 are diagrams showing the shape of signals as they appear at different points in the circuits labelled respectively 230 and 240 in FIG. 6.

The operation of comparison circuit 230 in FIG. 6 will now be described with the aid of the FIG. 7 diagram. This circuit is only active for part of the duration of a normal drive pulse P, while signal $I_a$ is supposed to be low. Signal P' is then identical to signal P. FIG. 7 shows during that time signals P, $F_c$, $I_r$, $I_x$, Z, $R_x$ and T' which have a periodicity of one second, with the exception of high frequency signals $F_c$ and $I_r$. In this diagram initial instant $t_i = 0$, defined by the rising edge of the pulse of signal P, is taken as the origin of time coordinate t.

Signal $I_x$ at the initial instant goes from low to high until an instant $t_1$. Instant $t_1$ is not critical provided interval $t_1 - t_i$ is sufficiently long.

The pulse of signal $I_x$ opens AND gate 231, enabling signal $F_c$ to reach the input CL of counter 232 supposedly reset during the previous cycle. Signal $F_c$ is of high frequency. It is made up of pulses and their counting begins at the initial instant. The number X of pulses counted is transferred to one input of comparator 233, the other input of this comparator receiving a given number M. When X becomes equal to M, signal Z at the output of the comparator goes from low to high and this transition determines control instant $t'_o$. The higher the frequency of signal $F_c$, the better defined this instant will be. Using for $F_c$ the oscillator signal of 32,768 Hz, $t'_o$ will be determined to within $+30$ μs, which may be considered accurate enough since $t'_o$ lies between 500 and 1000 μs. Supposing that signal T' at the output of bistable flip-flop 234 is of low logic level, the rising edge of signal Z applied to input S at instant $t'_o$ will cause signal T' to go high. Signal T' will remain high until an instant $t''_o$ when the flip-flop will be reset by the first rising edge in signal $I_r$ applied to its input R. Signal $I_r$ is made up of pulses and its frequency determines time interval $t''_o - t'_o$. If, for instance, the frequency of signal $I_r$ is equal to half that of the oscillator, this time interval will amount to 30 or 60 μs depending on which edge of signal $F_c$ triggered off the transition of signal Z. Since the duration of signal T' is not critical, this lack of accuracy is not bothersome. For circuit 230 to operate properly, instant $t''_o$ must always occur before instant $t_1$ when the counting of the pulses of signal $F_c$ by counter 232 stops, signal $I_x$ then going low. Supposing the maximal capacity of the counter has not been exceeded, number $X_1$ at instant $t_1$ will be greater than number M and signal Z will therefore remain high. This state of affairs will continue until an instant $t_2$—which is not very critical and later than $t_1$—when a pulse of signal $R_x$ applied to input R of counter 232, to reset it, causes the output of comparator 233 and signal Z to go low. The pulse of signal P ends at an instant $t_3$, later than $t_2$, without influencing comparing circuit 230 which remains in the same state until the next pulse of this signal.

It follows from the above that time interval $t'_o - t_i$ is proportional to the number M that counter 232 must reach in counting the pulses of signal F. The learning circuit 240 shown in FIG. 6 enables number M to be periodically adapted to the slowly varying characteristics of the motor. This circuit comprises a three-input AND gate 241. This first input is connected to the terminal 225 of circuit 214 to receive signal P' which, in this case, amounts to signal $I_a$ only, the second input is connected to terminal 220 to receive signal $F_c$ and the third input is connected to the output of an inverter 244 whose input is connected to terminal 227 to receive signal SC' generated by circuit 208 in response to signal $I_a$ applied to its terminals 201 and 207. The output of AND gate 241 is connected to the CL input of a binary counter 242. This counter has a reset input R connected to terminal 221 to receive signal $R_a$ and a multiple output $a_k$ (k=0 to 5) whose logic state determines a binary number $A = a_5 a_4 a_3 a_2 a_1 a_0$. A memory 243 receives on a multiple input number $A' = a_5 a_4 a_3 a_2 a_1 a_0$, which is deduced from number A by the suppression of least significant digit $a_0$. Clearly number A' is equal to the integer part of A/2. Memory 243 also has an input L, connected to terminal 223 to receive signal $I_m$, and a multiple output, connected to a multiple input of comparator 233. In response to a pulse of signal $I_m$ number A' found at the input is memorized and appears at the output in the form $M = m_4 m_3 m_2 m_1 m_0$ used previously.

The functioning of learning circuit 240 in FIG. 6 will now be described with the aid of the FIG. 8 diagram and with reference to FIGS. 2, 3 and 5a.

Figure 8:
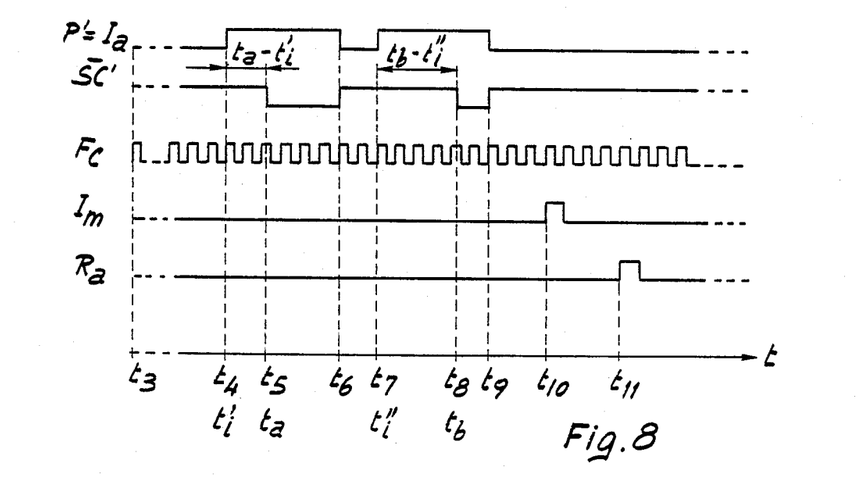

Signal $I_a$, shown in FIG. 8, contains two learning pulses. The first begins at instant $t_4$ or $t'_i$ and ends at instant $t_6$, while the second begins at instant $t_7$ or $t''_i$ and ends at instant $t_9$, the second pulse following the first after a time $t_7 = t_6$ of e.g. 1 ms. Preferably the durations $t_6 - t_4$ and $t_9 - t_7$ of these pulses are of equal length, between 2 and 3 ms. The learning pulses must appear while signals P and PC are of low logic level, e.g. between two drive pulses of signal P, i.e. approximately 500 ms after instant $t_3$. Finally the periodicity of signal $I_a$ is not critical and can typically be 64 seconds.

The first learning pulse of signal $I_a$, appearing between instants $t_4$ and $t_6$ and applied to the inputs 201 and 207 of circuit 208 in FIG. 3, causes, in the same way as a normal drive pulse of signal P beginning at instant $t_i$, a current to flow in motor coil 16, e.g. current $I_1$ shown in FIG. 2. Transistor 125 (FIG. 3) then being blocked, current I is measured by means of voltage $V_1$ across the terminals of resistor 124. As long as voltage $V_1$ is less than reference voltage $V_R$, the signal at the output of comparator 127, referenced SC', remains of low logic level. When $V_1$ has reached the value of $V_R$, at instant $t_a$ in FIG. 5a or $t_5$ in FIG. 8, logic signal $\overline{SC'}$ goes high. Between instants $t_4$ and $t_5$, signal $I_a$ and signal SC', opposite to SC', being of high logic level, signal $F_c$ travels through AND gate 241 in FIG. 6 and counter 242, previously reset by signal $R_a$, counts $A_a$ pulses of $F_c$ during time $t_5 - t_4$ corresponding to time $t_a - t'_i$ in FIG. 5a. Between instants $t_5$ and $t_7$ the count is stopped as one of signals $I_a$ or $\overline{SC'}$ is of low logic level.

A similar cycle again takes place with the second learning pulse of signal $I_a$ between instants $t_7$ and $t_9$. The only difference with respect to the previous case is that the current in coil 16 is current $I_2$, measured by means of voltage $V_2$, instead of current $I_1$. This voltage reaches reference value $V_R$ at instant $t_b$ or $t_8$. Counter 242, which has not been reset in the meantime, adds to number $A_a$, which it contains already, a number $A_b$ corresponding to the number of pulses of signal $F_c$ contained in time interval $t_b - t''_i$ or $t_8 - t_7$.

At instant $t_8$ (FIG. 8), counter 242 (FIG. 6) thus contains number $A_a + A_b$, equal to number $A = a_5 a_4 a_3 a_2 a_1 a_0$ mentioned earlier. This number is a measure of the sum of time intervals $t_a - t_i$ and $t_b - t_i$. The number $M = m_4 m_3 m_2 m_1 m_0$ which has been transferred into memory 243, being equal to A/2, is then a measure of the mean time interval required $\frac{1}{2}[(t_a - t'_i) + (t_b - t''_i)] = t'_o - t_i$, which defines control instant $t'_o$.

In order better to adapt the device according to the invention to the characteristics of the motor, it may be of advantage to compare the control current in coil 16 to a first reference current $I'_R$ and to determine time intervals $t_a - t'_i$ and $t_b - t''_i$ by using a second reference current $I''_R$. This represents an extension with respect to the described case in which the two reference currents were equal and had the value $I_R$. Similarly, instead of measuring the control current in coil 16 after the mean time interval $t'_o - t_i$, it may be of interest to make this measurement after a time control interval determined by an arbitrary function using the sum of time intervals $t_a - t'_i$ and $t_b - t''_i$. The mean time interval is then only a simple particular case.

These variants which are a generalisation of the device described remain of course within the scope of the invention.

I claim:

1. A method of identifying the angular rest position of the rotor of a stepping motor comprising a magnetized rotor having a pair of diametrically opposite poles liable to lie in two rest positions, a stator forming a magnetic circuit having saturable narrow portions and a coil coupled magnetically to the stator for setting up therein a magnetic field, said method comprising:
   applying to said coil an electric control pulse;
   measuring a control current, generated within the coil by said pulse, at the end of a control time interval counted from the beginning of said pulse;

comparing the control current with a first reference current; and determining the sign of the comparison between the two currents, this sign being representative of the rest position of the rotor, characterized in that, to determine the control time interval, it further comprises:

applying to the coil a first electric pulse;

measuring a first current in the coil generated by the first electric pulse;

determining a first time interval corresponding to the time needed by the first current to reach a second reference current;

memorizing the first time interval;

applying to the coil a second electric pulse having the same amplitude as the first but of opposite polarity;

measuring a second current in the coil generated by the second electric pulse;

determining a second time interval corresponding to the time needed by the second current to reach the second reference current;

adding the second time interval to the first; and determining the control time interval as a function of the sum of said first and second intervals.

2. A method as in claim 1, wherein said first and second reference currents are equal.

3. A method as in claim 1 or 2, wherein the control time interval is equal to the mean value of the first and second time intervals.

4. A device for determining the angular position of the rotor of a stepping motor comprising a magnetized rotor having a pair of diametrically opposite poles liable to lie in two rest positions, a stator forming a magnetic circuit having saturable narrow portions and a coil coupled magnetically to the stator for setting up therein a magnetic field, said device comprising:

means for generating an electric control pulse;

means for applying said pulse to the coil of the motor;

means for measuring a control current, generated in the coil by said pulse, at the end of a control time interval counted from the beginning of said pulse;

memory means for storing said control time interval;

means for comparing the control current with a first reference current and for generating a signal representative of the sign of the comparison, said sign indicating the angular position of the rotor, characterized in that it further comprises:

means for generating a first electric pulse;

means for applying said first pulse to the coil of the motor;

means for measuring a first current in the coil, generated by said first pulse;

means for determining a first time interval corresponding to the time needed by the first current to reach a second reference current;

means for generating a second electric pulse having the same amplitude as the first but of opposite polarity;

means for measuring a second current in the coil, generated by said second pulse;

means for determining a second time interval corresponding to the time needed by the second current to reach the second reference current;

means for adding the second time interval to the first; and means for calculating the mean value of said two time intervals and for transferring said mean value into said memory means, said value being the control time interval.

* * * * *